(12) United States Patent
Lyon

(10) Patent No.: US 6,715,233 B2
(45) Date of Patent: Apr. 6, 2004

(54) SELF-WATERING MODULAR PLANTER INSERT RESERVOIR

(75) Inventor: Christopher Lyon, Redwood City, CA (US)

(73) Assignee: Planter Technology, Inc., Hayward, CA (US)

( * ) Notice: Subject to any disclaimer, the term of this patent is extended or adjusted under 35 U.S.C. 154(b) by 0 days.

(21) Appl. No.: 10/058,646

(22) Filed: Jan. 28, 2002

(65) Prior Publication Data

US 2003/0140557 A1 Jul. 31, 2003

(51) Int. Cl.[7] ............................................... A01G 25/00
(52) U.S. Cl. ........................................................... 47/79
(58) Field of Search ................................ 47/79, 80, 81, 47/82, 86, 48.5, 66.1

(56) References Cited

U.S. PATENT DOCUMENTS

| | | | | |
|---|---|---|---|---|
| 3,137,969 A | * | 6/1964 | Sokol | 47/57.5 |
| 3,753,315 A | * | 8/1973 | Adam | 47/79 |
| 3,758,987 A | * | 9/1973 | Crane, Jr. | 47/80 |
| 4,329,815 A | * | 5/1982 | Secrest | 47/80 |
| 4,447,983 A | * | 5/1984 | Shinada | 47/48.5 |
| 4,885,870 A | * | 12/1989 | Fong | 47/79 |
| 5,046,282 A | * | 9/1991 | Whitaker | 47/79 |
| 5,095,649 A | * | 3/1992 | Brownlee | 47/41.01 |
| 5,097,626 A | * | 3/1992 | Mordoch | 47/79 |
| 5,337,930 A | * | 8/1994 | Fah et al. | 226/630 |
| 5,411,562 A | * | 5/1995 | Saparzadeh | 47/58.1 R |
| 5,671,562 A | * | 9/1997 | Fah | 47/79 |
| 5,956,899 A | * | 9/1999 | DiOrio | 47/80 |
| 5,983,564 A | * | 11/1999 | Stragnola | 47/62 R |
| 6,134,833 A | * | 10/2000 | Bachman et al. | 47/80 |
| 6,205,706 B1 | * | 3/2001 | Buss | 47/48.5 |

FOREIGN PATENT DOCUMENTS

| | | | |
|---|---|---|---|
| GB | 2281492 | * | 3/1995 |
| SU | 1586622 | * | 8/1990 |

* cited by examiner

Primary Examiner—Peter M. Poon
Assistant Examiner—David J Parsley
(74) Attorney, Agent, or Firm—Ron Fish; Ronald C. Fish, A Law Corp.

(57) ABSTRACT

A modular, expandable, self-regulating watering system for burial in planters, which do not have access to water pipes nearby for use in watering plants continuously with on the amount of water the plant needs and which can be refilled by relatively infrequent visits. The system is comprised of a plurality of hollow sections each of which has two upper ports and two lower ports, unless there are only two sections in which case only one upper port and one lower port is needed on each section. One section has a fill pipe that extends above the soil level. One section has an air port at the top thereof, or close to the top, which is coupled to an air tube, which is plugged at the other end with a hydrophilic sensor. Expansion sections can be added or subtracted to make the system larger or smaller. All sections are coupled together at their upper ports by flexible hose or tubing, and are coupled together by their lower ports by flexible hose or tubing.

10 Claims, 6 Drawing Sheets

SELF-WATERING MODULAR PLANTER INSERT RESERVOIR

BACKGROUND OF THE INVENTION

The prior art has taught self-watering planters in U.S. Pat. Nos. 4,329,815 and 6,134,833. Each of these prior art references teaches a planter with hollow walls, which store water and the use of a hydrophilic sensor, which is coupled via a tube to an air space above the water level in the reservoir. The hydrophilic sensor is buried in the soil and absorbs water from it. When the soil is dry, the sensor lets air pass through it, which lowers the vacuum level in the air space above the water. When this vacuum level is decreased, gravity and hydrostatic pressure force the water out an exit hole in the reservoir and into the soil. When water in the soil reaches the sensor, the sensor absorbs some of this water and becomes impenetrable to air. When the sensor becomes inpenetrable to air, the sensor no longer vents the space above the liquid in the walls of the planter to the atmosphere and causes the vacuum level to rise as water continues to flow out, and creates more free space at the top of the reservoir. When the vacuum level reaches a high enough level, water stops flowing. The cycle repeats when the plant consumes enough water to dry out the soil and causes the hydrophilic sensor to become passable to air again.

This system works well, but there are a very large number of sizes and shapes for planters, and to make all these sizes and shapes as self-contained, self-watering planters is impractical in the tooling costs to create tools in which to do the necessary rotational or injection molding. Thus, making every necessary size and shape of self-watering planter using the technology of U.S. Pat. No. 6,134,833 is impractical.

In many companies and other buildings, freestanding concrete or fiberglass planters, or built-in planter beds, are used to hold dirt in which decorative plants are planted to dress up the atmosphere of the building. These planters can be of any size and shape. Frequently, they are placed in locations where there is no access to water pipes so as to enable use of automatic irrigation systems to supply water to the plant. This results in a need for frequent manual watering of the plants by company employees, or the need to hire a plant care service to make frequent visits to make sure the plants are getting enough water. This is a nuisance and is expensive. Further, if the employees fail to water the plants frequently enough, or supply too much water, the plants can die or not prosper. Further, typically, when employees water plants, they keep pouring water into the planter until they see water appear in the saucer below the planter. At that point, the combination of water already in the saucer and in the soil is greater than the capacity of the saucer, which will cause overflow of the saucer and create slip-and-fall liability exposure. The same thing happens if an automatic irrigation system has its water time set for too long an interval. Since large plants used in large planters are generally more expensive, failure to properly water them can result in undesirable and costly losses among the plant population.

In the prior art, building owners have attempted to run underground water pipes to the locations of the freestanding planters to enable use of automatic sprinkler systems. The problem with this approach is that it fixes the location of the planter such that once the pipe is run, the planter cannot be moved to another location without a costly, disruptive relocation of the underground pipes. Further, if pipes are run under sidewalks or flooring, any leaks in the pipes can damage the flooring materials or wash away earth, serving as foundation for the sidewalk or get in the cracks in the flooring or sidewalk, and causes damage such as cracking when freezing, resulting in expansion of leaked water occurrence. Leaked water from a cracked pipe or overflow by an automatic sprinkler system of "saucer" overflow containment reservoirs placed below freestanding planters can cause slip-and-fall liability exposure to building owners.

Further, in many new multi-use high-rise buildings with commercial offices on the lower floors and residential space on the upper floors, zoning requirements or living condition considerations often give rise to the need for a garden zone in the building. This is often placed on the roof. This creates a problem in running water pipes to the greenbelt zone on a rooftop because owners are hesitant to penetrate the waterproofing of the roof to run pipes up to the rooftop garden. Further, a burst pipe on a rooftop can result in large damage awards for water damage to residential and businesses below the rooftop garden.

There are several other modular reservoir products on the market now, which are buried in the planter dirt to supply water to the plant(s). These prior art products consist of a single hollow container, which is filled with water and buried in the soil at the bottom, or part way up from the bottom. Also, in the prior art, multiple units have been linked together with flexible tubing for larger applications. A fill tube sticks up through the soil for filling. The container has an outlet, which allows water to be drawn out into the surrounding soil by capillary action. The water continues to wick out of the container until the soil is saturated, and capillary action no longer draws water out of the container. These products have reservoirs, which are too small, and the water system does not regulate flow of water to the plants on an as-needed basis, but on a saturation basis. As a result, problems arise with the reservoir running dry and with the plants getting too much water or not enough. Saturation soaks the soil, which puts the plant under stress and causes growth of anaerobic bacteria in the bottom of the planter, which causes a bad smell. Further, the small reservoirs cause the need for frequent maintenance visits, which drives the cost to the customer up, and this problem is exacerbated by the fact that the prior art devices are supplying the plants with far more water than they actually need for good health. Other approaches, such as false bottom containers with reservoirs below the false bottom with wicks that go up in to the soil above the false bottom. These approaches also saturate the soil and cause stress to the plant and the growth of bacteria and smelly planters. As a result, these products have not been commercially successful.

Accordingly, a need has arisen for an irrigation insert, which solves all the above-noted problems. The multiplicity of sizes of large containers in all materials make producing self-contained units, as taught in plant U.S. Pat. No. 6,134,833 for all sizes impractical. There are thousands of variations of sizes and shapes of planters and containers. An apparatus is needed which provides the self-watering advantages of U.S. Pat. No. 6,134,833 but overcomes the drawback of the need for thousands of different sizes and shapes. The apparatus should be a single system which can, with a limited number of parts, provide a self-watering solution for a broad array of container size and shapes including containers that are not self watering and for which plumbing a water line thereto would be impractical or undesirable for other reasons.

SUMMARY OF THE INVENTION

The above-described needs are filled by a modular plant water reservoir, which is buried in a planter and which stores water therein, which is metered out into the soil using a hydrophilic sensor that the plant only gets the water it needs to prosper. The reservoir is modular in that it is comprised or a plurality of individual sections. Each section has an upper port and a lower port. All the upper ports are coupled together by hoses or tubing, which form an airtight passageway so that all the upper portions of the reservoirs are in fluid communication with each other so that the pressure in each reservoir upper portion is the same as in every other section. The lower ports are also coupled together by hoses or tubing that form a watertight passageway so that water in each section can flow to the other sections so that the water level in each section is the same. At least one of the sections has a fill tube, which is long enough to extend above the top surface of the soil when the modular watering system is buried.

At least one of the sections has an air hole located in a wall of the section so as to be above the water level when the modular watering system is filled with water. This air hole is coupled by a hermetic seal to a flexible air tube, which has, at its other end, a hydrophilic sensor/plug, which only lets air into the tube when the soil is too dry and the plant needs more water.

The hydrophilic sensor only allows enough water to enter the soil until there is enough water in the soil to cause the hydrophilic sensor to become airtight. When the hydrophilic sensor becomes airtight, it cuts off airflow into the top of the reservoir. The water continues to flow out the bottom outlet holes briefly until the falling water level creates a sufficient vacuum level in the top of the reservoir to stop further flow of water into the soil through water outlet holes in the bottom of the reservoir.

DETAILED DESCRIPTION OF THE PREFERRED EMBODIMENT

Figure 1:
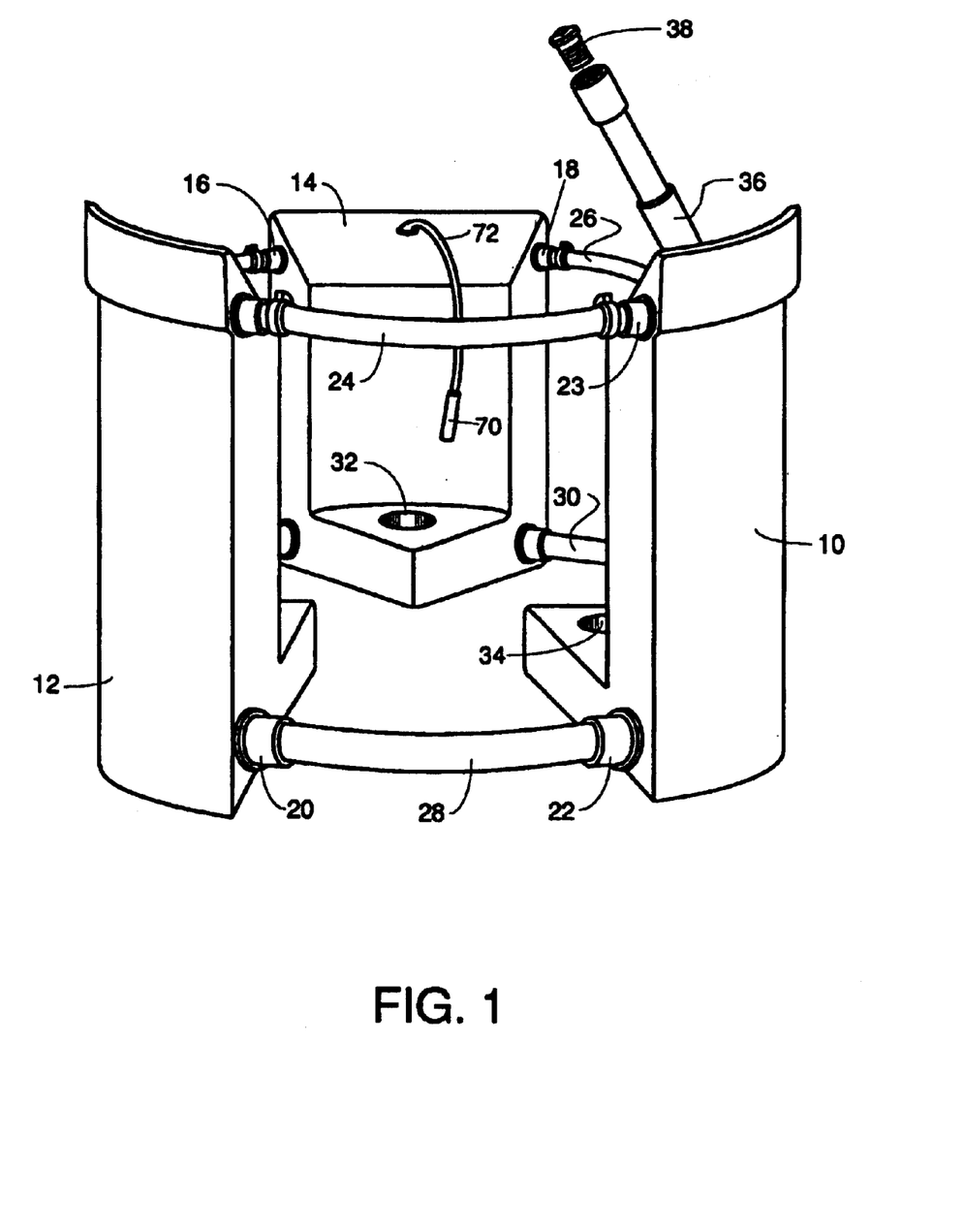
FIG. 1 is a perspective view of a three-section species of a flexible, expandable, modular, self-regulating water system, which can be buried in a planter.

FIG. 1 is a perspective view of a modular watering system within the teachings of the invention. This system is a modular reservoir having multiple reservoir sections which are connected by flexible water and air hoses. Because the number of modular reservoir sections can be varied, the system is expandable to fit any size planter. Once the system is filled with water, the system automatically waters plants in the planter with the amount of water they need for good health. The amount of water that is metered into the soil is controlled by airflow through a hydrophilic sensor 70 at the end of an air tube 72, which is coupled to an air port in the top of one of the sections. The air tube is long enough that the hydrophilic sensor can be buried at the appropriate height within the planter to insure the root ball gets enough water. The system works to meter water into the soil through exit holes in the bottom of one or more of the reservoir sections until the hydrophilic sensor absorbs enough water from the soil to become airtight. This blocks airflow through the air tube 72 into the top of the reservoir. Blocking of this airflow does not stop the flow of water immediately. Water continues to exit the water exit holes until the water level drops sufficiently to draw a vacuum in the upper levels of the reservoir sections, which is sufficient to stop the flow of water. Water outflow stops when the suction of the vacuum so created on the water is sufficient to overcome the force of gravity pushing water out the bottom of the reservoir and the force of capillary action drawing the water out of the reservoir and up through the soil. The principle of operation is the same as that in U.S. Pat. No. 6,134,833 owned by the assignee of this invention. The U.S. Pat. No. 6,134,833 is hereby incorporated by reference.

The system, in the example of FIG. 1, is comprised of three reservoir sections 10 (a fill pipe unit), 12 (a water storage extension unit, although all three units store water), and 14 (a sensor unit that controls water flow). Each section has two upper ports of which 16 and 18 are typical. Each section has two lower ports of which 20 and 22 are typical. Each section is coupled via its upper ports and two upper hoses, of which hoses 24 and 26 are typical to an upper port of its neighboring sections. Each section is coupled by its bottom ports and two lower hoses, of which hoses 28 and 30 are typical to a lower port of a neighboring section. The hoses form watertight, hermetic seals with the upper and lower ports such that when all sections are coupled together, the plurality of sections forms one large water reservoir where water can flow from section to section by the lower hoses and air pressure, or more precisely, vacuum levels, is equilibrated so as to be equal in all sections by airflow through the upper hoses.

Use of hoses and sections allows more reservoir sections to be added to create bigger reservoir systems to fit bigger planters, and allows fewer reservoir sections to be added to create smaller reservoirs for smaller planters. In the embodiment of FIG. 1, the sections are shown as having horizontal, pie wedge shaped bottom sections that come together to form a circular pie wedge shaped bottom when short hoses are used. Longer hoses allow the three reservoir section system to expand in diameter so as to fit the inside diameter of a large circular planter. Generally, the modular system is sized by proper hose length selection and addition of water storage modules so as to fit snugly against the inside walls of the planter when buried. However, the system does not have to be sized to fit the diameter of the planter, and can be made smaller than the diameter of the planter. The pie wedge shaped bottom section is not necessary, and the reservoir sections can be simple, flat, vertical, hollow containers. In the preferred embodiment, each reservoir section has a curved outer wall to conform to the shape of the inside wall of the container. Some embodiments have flat back walls for rectangular planters and some have large radius back walls.

At least one, but preferably all the sections, has tiny water outlet holes in a bottom section of the reservoir, which will be below the water line as long as the reservoir has a reasonable amount of water in it. In the particular embodiment of FIG. 1, the water outlet holes are in the bottom of insets that look like cup holders shown at 32, 34, and another location not visible in section 12. The purpose of the insets is to lower the level of the water outlet holes as low as possible in the reservoir, but still allow the water to exit upward. For that purpose, the insets are deep enough to put the water outlet holes close to or at the lowest level in the reservoir. However, the insets are not necessary, nor is it necessary for the holes to be located so as to allow the water to exit upward. In alternative embodiments, the water exit holes can be put on the outside walls of the sections at the lowest points, or on the inside walls at the lowest points, or on the side walls at the lowest points. They can also be located at points higher up, but this limits the amount of water that can be drained from the reservoir before the water level gets to the level of the water exit holes. Once that happens, the reservoir is no longer useful for self-watering since it relies upon maintenance of a vacuum in the upper portions of the reservoir to stop water flow from a hydrophilic sensor 70 becomes airtight.

Figure 2:
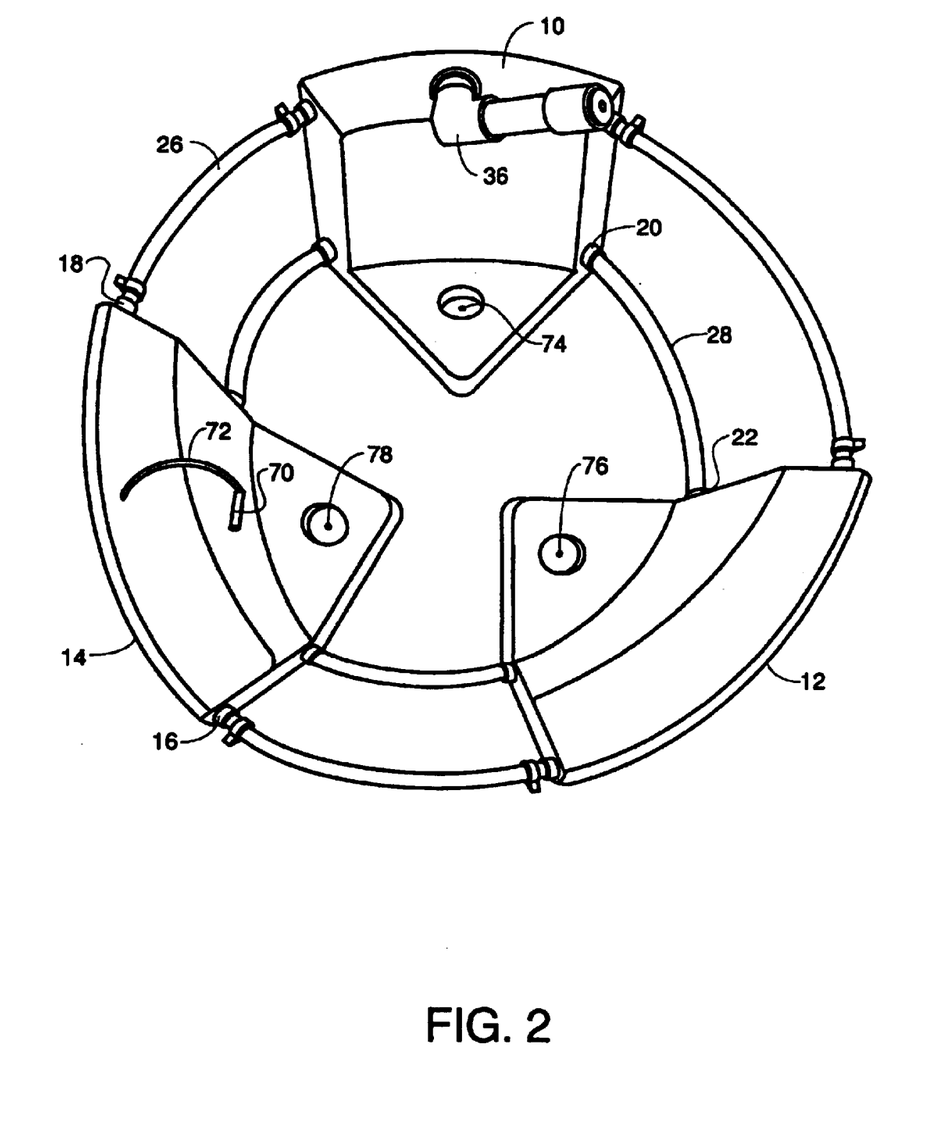
FIG. 2 is a top view of a system of FIG. 1.

FIG. 2 is a top view of the system of FIG. 1 showing water exit holes 74, 76, and 78. In the preferred embodiment, there are water exit holes in each segment of the reservoir. Preferably, there are water exit holes approximately every 18 inches around the diameter and along the radius of the planter for good coverage of the root system. In some reservoir segments, there are multiple water exit holes. More water holes result in more water flowing into the soil, but do not necessarily affect the time from release of the water by the hydrophilic sensor and the time the water reaches the sensor and closes it again. This time depends mostly upon the packing of the soil.

The water exit holes are made as small as possible, consistent with the need to keep dirt out while still allowing water to exit. The need to keep dirt out is grounded in the need to prevent plugging of the holes. In the preferred embodiment, a drill bit which is thirty-five thousandths of an inch in diameter, is used to drill the water exit holes. Water exit holes do not need to be in every reservoir section. Only one section needs to have water exit holes for the system to work.

At least one section needs to have a water fill tube 36 projecting from a point high on the reservoir section for use in filling the reservoir with water after it is buried. The fill tube obviously needs to be long enough to reach above the surface of the dirt after it is buried. The installing contractor in the field will cut the pre-supplied PVC pipe to length and glue the PVC cement to make a fill pipe of the needed length. The fill tube is plugged with a stopper 38 after filing the reservoir with water. The stopper must create a hermetic seal in the end of the fill tube so as to prevent any air from leaking into the top portion of the reservoir after a hydrophilic sensor becomes airtight, thereby signaling the time when the water flow stoppage process begins. Preferably, one stopper is of the variety, which has a threaded bolt driven expansion mechanism inside it. To use this type stopper, it is placed in the full tube end and the bolt is turned to expand the rubber of the stopper against the inside walls of the fill tube to create the seal. Preferably, the threaded bolt has a specially shaped slot requiring a special tool so as to prevent sabotage by just anybody who happens to have a screwdriver and happens to be walking by. Although the water fill tube 36 is shown as orthogonal to an angled surface at the top of the reservoir, this is only necessary to clear the overhanging lip on many planters. That is, many planters have a top edge that extends inward past the diameter formed by the inside walls. To clear this lip, the tube is angled inward, but an L-shaped fill tube could also be used, and in planters without an overhanging lip, a flat top reservoir shape can be used with the tube sticking straight up.

The hydrophilic sensor 70 is made to have hydrophilic properties by application of a surfactant. The sensor is then sintered to obtain a desired port size. It is known that when the surfactant is applied before the sintering, the sensor maintains its hydrophilic properties longer. If the surfactant is applied after sintering, the sensor will be rendered hydrophilic, and the planter will work as described above. However, the hydrophilic properties do not last nearly as long as in the case where the surfactant is applied before the sintering. The reason for this is not understood by the applicant. Pre-treating with surfactant before sintering allows the hydrophilic properties and surfactant to last up to about 5 years. The hydrophilic sensor can be made simply by applying surfactant after sintering in some embodiments, but then the surfactant will disappear from the sensor in about 6 months. This requires the sensor to be replaced. As soon as the surfactant leaves, the sensor is open all the time, and the planter stops automatically watering and waters all the time until the water runs out.

The preferred hydrophilic sensor material is commercially available from GenPore of Reading, Pa. under quote 8022301. Hydrophilic sensor material may also be obtained from Porex in Atlanta, Ga.

Figure 3:
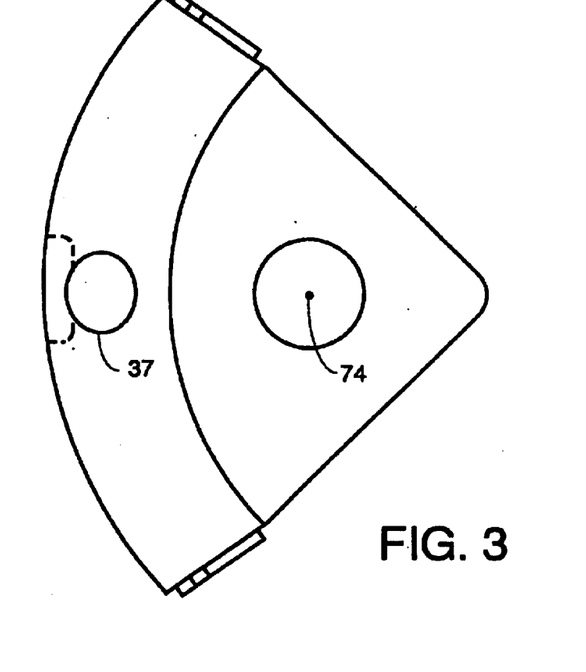
FIG. 3 is a top view of a single section.
Figure 4:
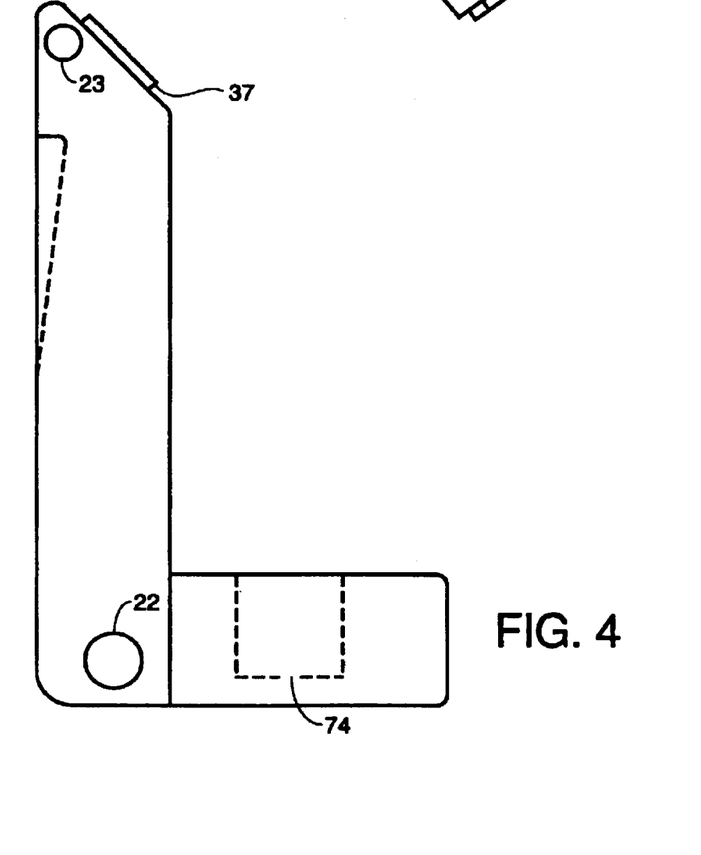
FIG. 4 is a side view of a single section.
Figure 5:
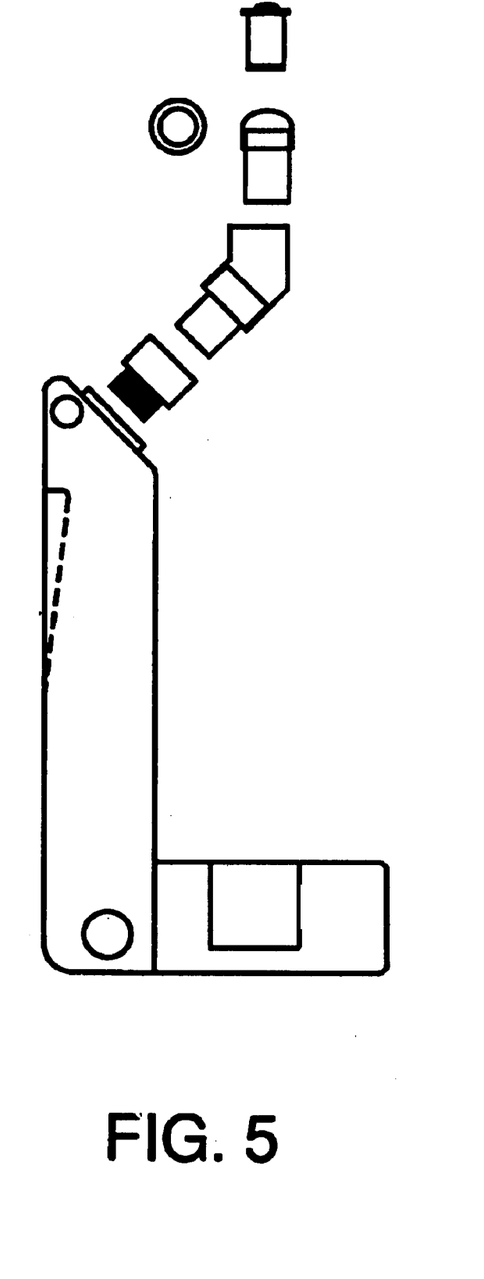
FIG. 5 is a side view of a single fill pipe section with an expanded view of an elbow-shaped fill pipe.
Figure 6:
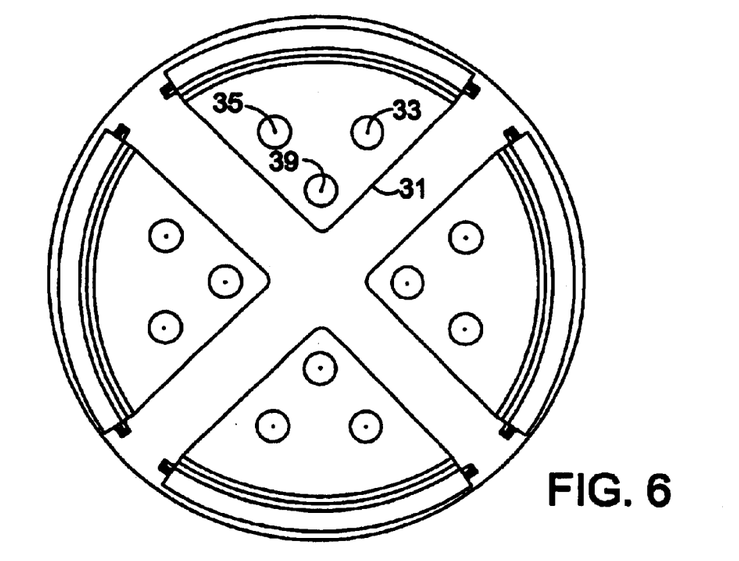
FIGS. 6 and 7 are top views of two different species of a 4-section system without the details of the fill pipe and hydrophilic sensor added.
Figure 7:
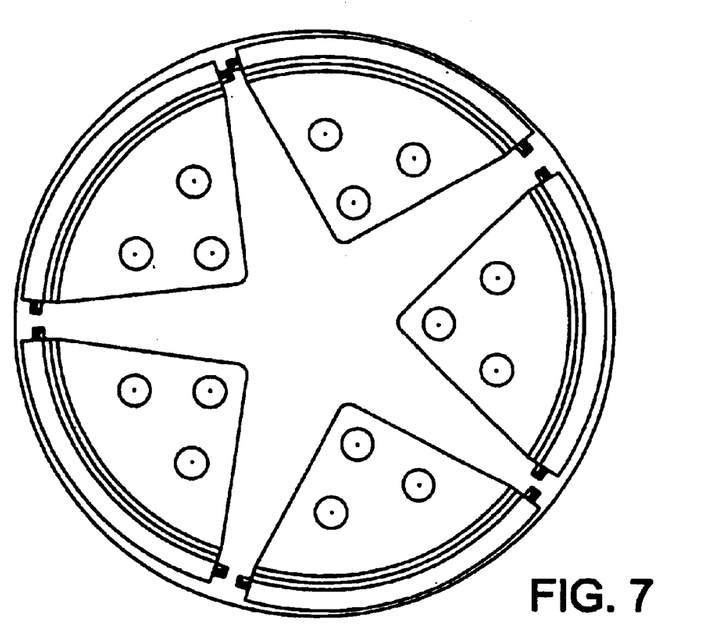

FIG. 3 shows a top view of an isolated reservoir section with a port 37 for the water pipe 36. FIG. 4 shows a side view of the section shown in FIG. 3. FIG. 5 shows an exploded view of the fill pipe in an elbow shape for a vertical emergence form the soil, but having a section angled inward to get out from under the overhanging lip. FIGS. 6 and 7 are top views of other shapes for bottom sections in 4-section reservoirs. Each of these bottom sections, of which section 31 is typical, has three insets, shown at 33, 35 and 39, each with one water exit hole.

In some embodiments where half round and quarter round planter shapes are in use, a single section like section 10 in FIG. 1 may be used with the addition of an air vent, air tube 72, and sensor 70 to the top surface from which the fill tube projects. Obviously, the upper and lower ports on each side have to be plugged.

Figure 8:
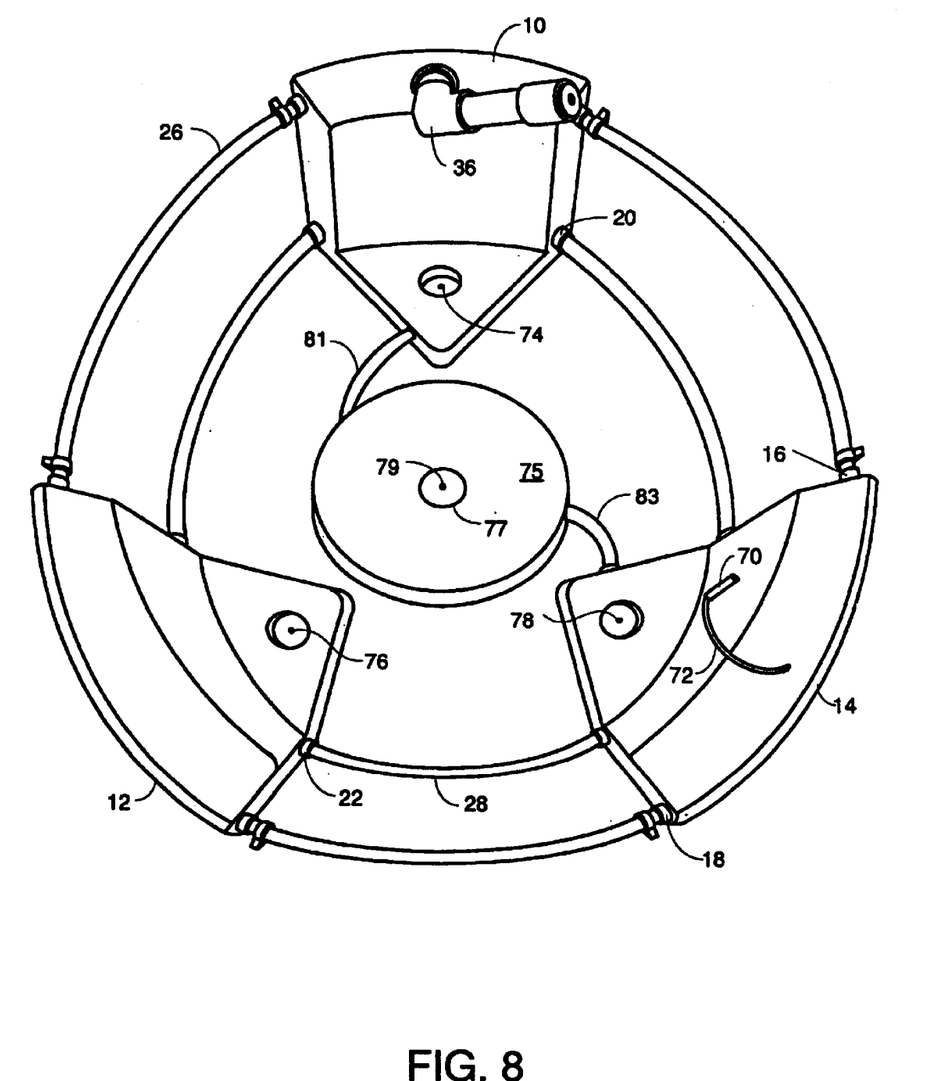
FIG. 8 is a top view of an expanded species, which uses an auxiliary disk at the bottom of the reservoir to store more water and provide an additional water exit hole in the center of the planter.

The height of the reservoir sections and radii of the outer walls are made in a plurality of different sizes in each size being compatible with a range of planter heights and diameters. In very large planters, it may be necessary to add a supplementary disk reservoir section in the center of the bottom of the reservoir to provide water coverage for that area, as shown in FIG. 8. In this embodiment, a center disk reservoir section 75 with a cup holder inset 77 and a water exit hole 79 is placed in the center of the planter at the bottom of the reservoir system. This center section is coupled to the pie wedge shaped bottom sections of the other reservoir sections by hoses 81 and 83 to receive water.

Although the invention has been disclosed in terms of the preferred and alternative embodiments disclosed herein, those skilled in the art will appreciate that modifications and improvements may be made without departing from the scope of the invention. All such modifications are intended to be included within the scope of the claims appended hereto.

What is claimed is:

1. A modular, expandable, self-regulating water system for burial in a planter, comprising:

a plurality of hollow reservoir sections each of which can contain water and each of which has an upper port and a lower port with said lower port in each reservoir section being below the water line when said reservoir section is full of water, and said upper port being located at or near the too of each reservoir section;

one or more upper hoses or pipes or conduits (hereafter referred to as hoses) that couple said upper ports of all said hollow reservoir sections together in airtight fashion so as to allow air to flow from one reservoir section to another;

one or more lower hoses or pipes or conduits (hereafter referred to as hoses) that couple said lower ports of all said hollow reservoir sections in said plurality of hollow reservoir section together in watertight fashion so as to form a reservoir comprised of a plurality of reservoir sections having their upper ports coupled together by hoses to form a path for air to flow from one reservoir section to another and having said lower ports of said reservoir sections connected together by hoses so as to allow water to flow from one reservoir section to another;

and wherein at least one of said reservoir sections has a fill pipe through which water can be added to fill said reservoir, said fill pipe being long enough to extend above soil in a planter in which said reservoir is buried, said fill pipe having a removable stopper, which forms an airtight seal;

and wherein at least one of said reservoir sections has one or more water outlet holes in a low portion thereof so as to allow water to escape into said soile in said planter;

and wherein at least one of said reservoir sections has an air hole located in a wall of said reservoir section at or above the maximum height water will reach when the reservoir section is filled a piece of tubing having a first end hermetically coupled to said air hole and having a second end which is plugged with a hydrophilic sensor, said tubing being flexible and long enough such that said hydrophilic sensor material can be buried in the soil of a planter in which said self-regulating water system is buried.

2. The apparatus of claim 1 wherein said reservoir sections which has said fill pipe coupled thereto is not the same reservoir section as the reservoir section which has said air hole therein.

3. A reservoir section for a modular, expandable, self-regulating watering system for burial in a planter, said self-regulating watering system comprised of one or more reservoir sections, and wherein each said reservoir section comprises:

a hollow reservoir section having a configuration comprised of a hollow vertical section with curved outer wall and a hollow pie slice shaped horizontal section which joins said vertical section at the bottom thereof and which has an outer edge which is curved and which one edge of a triangle with two other edges which generally form the triangular pie slice shape of said horizontal section, said horizontal section joined to said vertical section so as to form one hollow cavity which is generally L shaped, said curved outer wall of said vertical section being such that when a plurality of reservoir sections are joined together, their outer walls define a generally circular configuration, and and wherein said vertical section has one or more upper ports located in an upper portion so as to be above the water line when said reservoir section is filled with water, said upper port for coupling to one or more upper hoses or pipes that are used to couple said upper ports of a plurality of hollow reservoir sections together in airtight fashion to allow air to flow through said upper hoses between reservoir sections, and said vertical section or said horizontal portion having one or more lower ports located so as to be below the water line at least when said reservoir section is full of water, said one or more lower ports for coupling to one or more hoses or pipes that are used to couple said lower ports of all said hollow reservoir sections so as to allow water to flow between said reservoir sections.

4. The apparatus of claim 3 wherein said air hole is formed anywhere in the top portion of said reservoir which is above the water line when said reservoir is full, but not being formed through said removable stopper.

5. The apparatus of claim 3 wherein said reservoir segment is comprised of a hollow vertical wall segment which is in fluid communication with a hollow horizontal wall segment, both said horizontal and vertical wall segments for containing water, and wherein said one or more water outlet holes are small enough such that the reservoir will not empty or largely empty when said stopper is removed thereby allowing vacuum above the water in said reservoir to be filled with air and allowing atmospheric pressure to act on a top surface of water in said reservoir, and wherein said water outlet holes are located in the upper surface of said horizonal wall segment, said upper surface of said horizontal wall segment being defined as the surface closest to the top of the water in said reservoir.

6. The apparatus of claim 3 wherein said fill pipe is configured or points in a direction so as to not interfere with an overhanging lip on the inside wall of a planter in which said self-watering system is buried, and further comprising a removable stopper which is a tamper proof in that it requires a tool to remove said stopper so as to prevent passerby or vandalists from removing the stopper for sport or malicious purposes unless they have the required tool.

7. The apparatus of claim 3 wherein said reservoir section has a fill pipe for filling said reservoir section with water, which is long enough to extend above the soil in which said modular watering system is buried, said fill pipe having a removable tamper proof stopper which forms an airtight seal.

8. The apparatus of claim 3 wherein said reservoir section has one or more water outlet holes in a low portion thereof which are small enough to not allow the reservoir section to completely empty in a short amount of time when atmospheric pressure is allowed to act upon the top surface of water in said reservoir section.

9. The apparatus of claim 3 wherein said reservoir section further comprises:

an air hole located in a wall or a top surface of said reservoir section so as to be at or above the maximum height water will reach when the reservoir section is filled;

a piece of tubing having a first end hermetically coupled to said air hole and having a second end plugged with a hydrophilic sensor plug material, said tubing being flexible and long enough such that said hydrophilic sensor material can be buried in the soil of a planter in which said self-regulating water system is buried.

10. A method of forming a modular, expandable, self-regulating watering system for burial in a planter, comprising the steps of:

measuring the dimensions of a planter in which said watering system is to be buried; selecting one fill pipe section and one sensor section and a number of expansion sections needed to create a final reservoir structure of said self-regulating watering system, at least one of said sections having water escape holes in a lower portion thereof to allow water to escape from said final reservoir structure when it is assembled and buried in a planter, said final reservoir structure being large enough to hold enough water for the plants to be planted in said planter, but not so large that said reservoir structure cannot be buried in said planter, where a fill pipe section is a hollow reservoir section which can contain water and which has at least one upper port which is located so as to be above said water line at all times and at least one lower port which is located so as to be below said water line at least when said reservoir structure is full of water and a port coupled to a fill pipe for filling said reservoir section with water and having a stopper which hermetically seals said fill pipe when said stopper is in the closed position, and wherein a sensor section is a hollow reservoir section which can contain water and which has at least one upper port which is located so as to be above said water line at all times and at least one lower port which is located so as to be below said water line at least when said reservoir structure is full of water and an air port high enough in said reservoir structure to be above the water line when said reservoir structure is full, said air port being coupled to an air tube having a first end and a second end, said first end coupled to said air port, said second end being plugged by a hydrophilic sensor, and wherein an expansion section is a hollow reservoir section, which can contain water and which has at least one upper port which is located so as to be above said water line at all times and at least one lower port which is located so as to be below said water line at least when said reservoir structure is full of water;

coupling all said reservoir sections together at their upper ports by flexible hoses or tubing so as to form a hermetic seal between said upper ports and said hoses; and coupling all said reservoir sections together at said lower ports by flexible hoses or tubing so as to form a watertight seal between said hoses and said lower ports so as to form said final reservoir structure.

\* \* \* \* \*